UNITED STATES PATENT OFFICE.

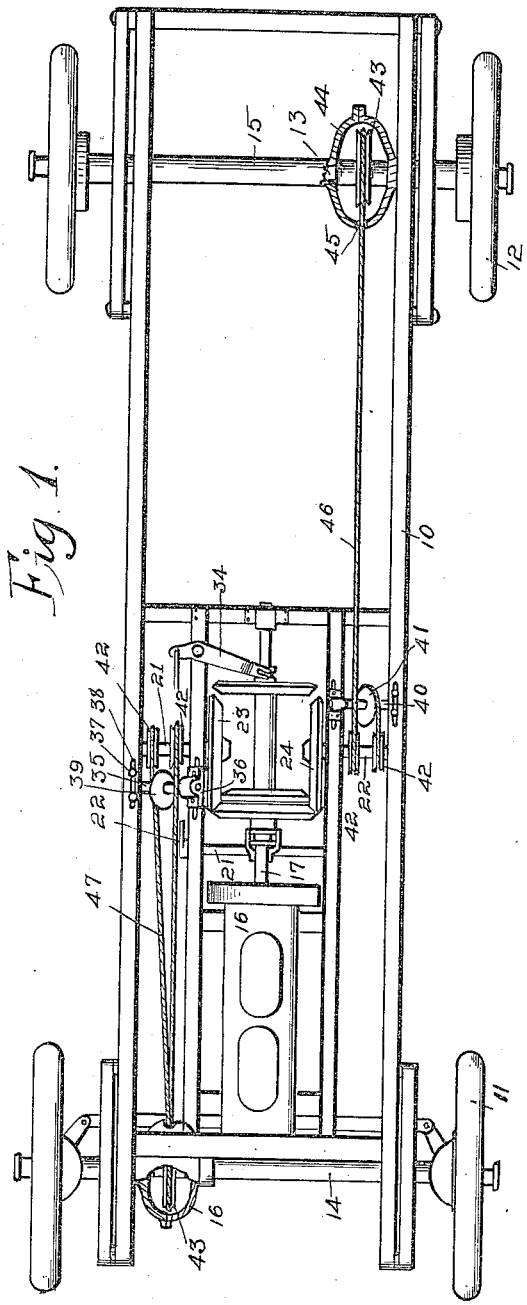

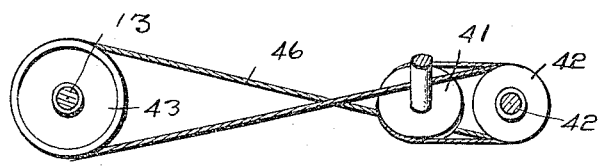
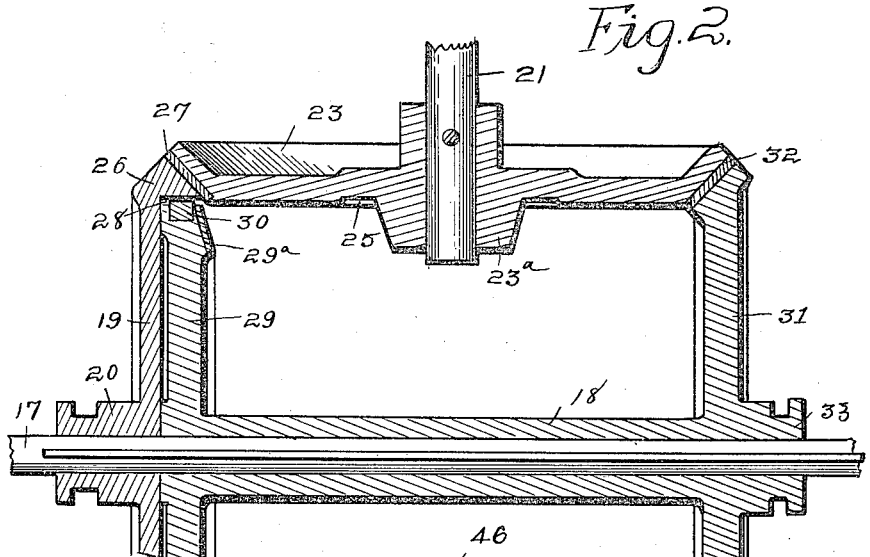
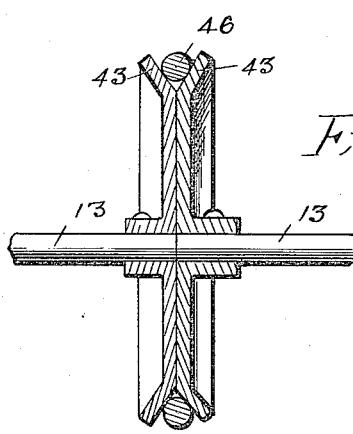

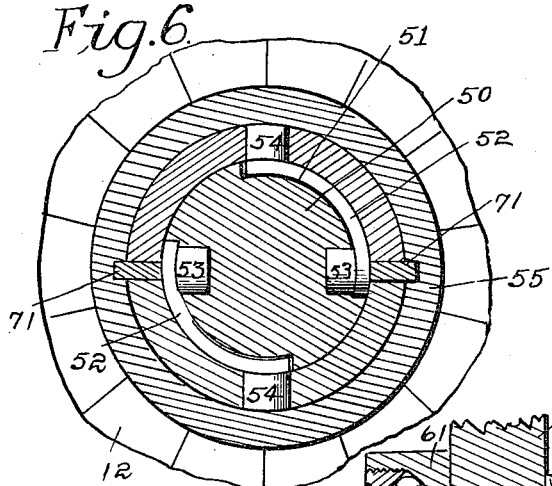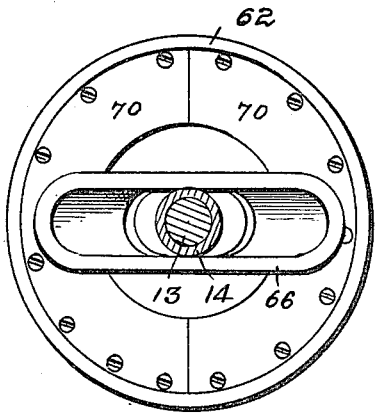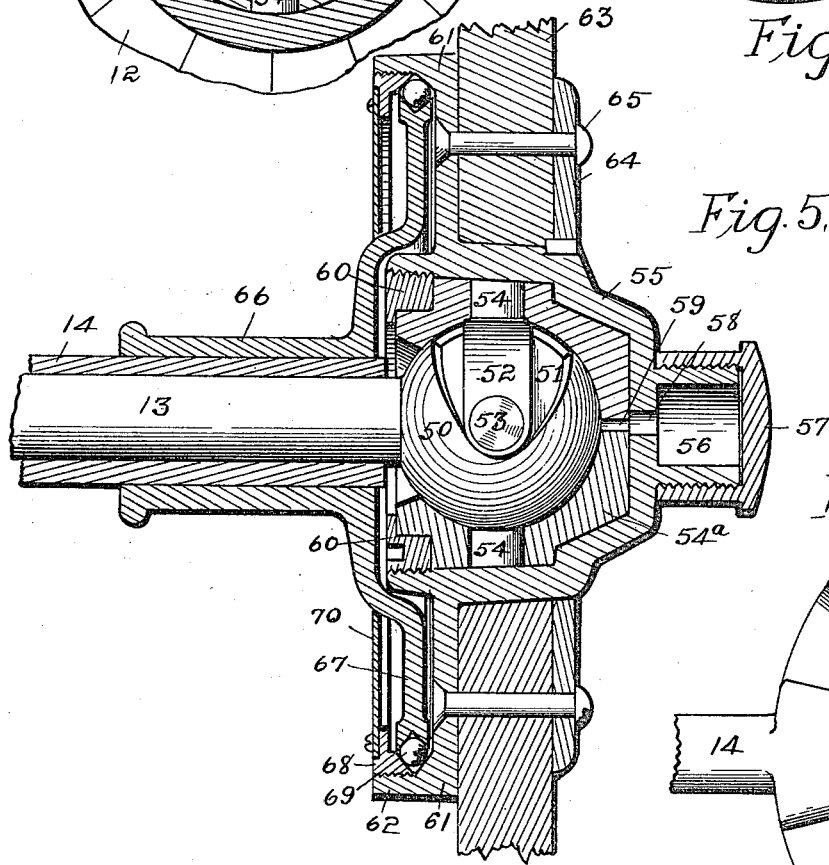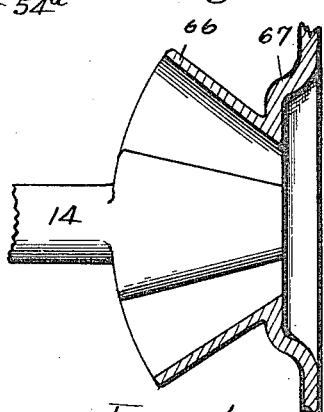

EUGENE H. AVERY, OF BRADGATE, IOWA.

GEARING.

1,150,568. Specification of Letters Patent. Patented Aug. 17, 1915.

Application filed May 26, 1913. Serial No. 770,058.

*To all whom it may concern:*

Be it known that I, EUGENE H. AVERY, a citizen of the United States, and resident of Bradgate, in the county of Humboldt and State of Iowa, have invented a new and useful Gearing, of which the following is a specification.

The object of my invention is to provide a gearing especially designed for use on a truck, comprising mechanism of simple, durable and inexpensive construction, for driving all four wheels of the car.

Still a further object is to provide a friction drive mechanism of new and novel construction whereby I am able to secure a maximum of frictional surface between the driven disk and the fiber band on the driving wheel when the machine is running either at high or low speed.

My invention consists in certain details, in the construction, combination and arrangement of the various parts of the device, whereby the objects contemplated are attained, as hereinafter more fully set forth, pointed out in my claims and illustrated in the accompanying drawings, in which—

Figure 1 shows a top or plan view, partly in section, of a motor chassis, embodying my invention. Fig. 2 shows a detail, sectional view of part of my friction transmission. Fig. 3 shows a detail, sectional view of one of my differential pulleys. Fig. 4 shows a detail view of the rope drive transmission to the front wheels. Fig. 5 shows a detail, sectional view of the mechanism whereby the front wheel is mounted on the axle. Fig. 6 shows a sectional view through the ball and socket joint, shown in Fig. 5, taken at right angles to the view shown in said figure. Fig. 7 shows a sectional detail view of a portion of the sleeve or casing at the outer end of the front axle, and Fig. 8 shows a sectional detail view of a portion of one of the front wheels, from the middle line of the vehicle.

In the accompanying drawings I have used the reference numeral 10 to indicate generally the frame of my improved motor truck which is suitably mounted on front wheels 11 and rear wheels 12 mounted upon axles 13 on which are sleeves 14 and 15. Mounted on the frame 10 is an engine 16 of any suitable type for supplying power to my improved motor. Extending rearwardly from the engine is the engine shaft 17. On the shaft 17 is a feathered sleeve 18. Between the sleeve 18 and the engine is mounted a friction wheel 19 of peculiar construction, having a hub 20 operatively connected with a transverse rock shaft 21 on which is a lever 22 whereby the wheel 19 may be given sliding movement on the shaft 17. On each side of the shaft 17 are rotatably mounted short shafts 21 and 22. On the shafts 21 and 22 respectively are friction wheels 23 and 24. Adjacent to the middle of the friction wheels 23 and 24 each wheel is provided with a groove or slot 25. At their outer edges the wheels 23 and 24 are beveled, as shown in Figs. 1 and 2. At the circumference of the friction wheel 19 is a rim 26 having a beveled edge on which is a fiber friction band 27, designed in one position of the sliding movement of the wheel 19 to engage the beveled edges of the wheels 23 and 24. The rim 26 is provided on its inner surface, adjacent to the shaft 17, with a groove or slot 28. Formed on the sleeve 18 at its end adjacent to the wheel 19 is a friction wheel 29 on the periphery of which is a fiber friction band 30. The wheel 29 is also provided at its outer edge with a beveled face which carries a fiber friction band 29$^a$.

The wheels 19, 23, 24 and 29 are so constructed that when the wheel 29 is opposite the slots or notches 25 or 28 the band 30 will be spaced apart from the rim 26 on the wheels 23 and 24, as the case may be. The wheels 23 and 24 are provided with inwardly extending hubs 23$^a$, having beveled faces designed to be engaged by the fiber bands 29$^a$. When the wheel 29 is moved to any position where the band 30 is between the slots 28 and 25, said band will engage the wheels 23 and 24 frictionally. Near the end of the sleeve 18, opposite the wheel 29 is a friction wheel 31, having a beveled edge which carries a fiber friction band 32, designed in one position of the wheel 31 to frictionally engage the beveled edges of the wheels 23 and 24. Formed on the sleeve 18, adjacent to the wheel 31 is a hub 33 operatively connected to a lever 34 whereby the sleeve 18 may be given sliding movement on the shaft 17.

It will be understood that any suitable mechanism may be provided for operating the levers 22 and 21 in such manner that it will be impossible for the wheel 19 to be in engagement with the wheels 23 and 24 when either the wheels 29 or 31 are in engagement with said wheels 23 and 24.

I do not confine myself to a smooth bevel 23ª and a beveled face which carries the friction band 29ª, as it would be possible to use beveled gears instead of friction gears at this point, and it is my intention to cover beveled gears as well as friction gears for running at high speed.

Near one side of the frame 10 is an upwardly and inwardly extending shaft 35, mounted in bearings 36 which are adjustably mounted on the frame by means of bolts 37 extended through slots 38 on the frame. On the shaft 35 is a pulley 39. The shaft 35 is located in front of the adjacent shaft 21. Located in the rear of the shaft 22, on the other side of the frame, is an upwardly and inwardly extending shaft 40, mounted on the frame 10 in a manner similar to the mounting of the shaft 35. On the shaft 40 is a pulley 41. On each of the shafts 22 and 21 are two pulleys 42. The shafts 13 are divided as shown in Fig. 3. Formed on the parts of the shafts 13, at their adjacent ends, are halves of the divided pulley 43. On the sleeves 14 and 15 are formed casings 46 for inclosing the pulleys 43 and forming a firm support for the ends of the shafts. In each of the casings 44 is an opening 45 to permit the passage of the belt or rope hereinafter described. Secured to one of the pulleys 42 on the shaft 22 is a rope 46 which is extended over the pulley 41, then over the pulley 22, then over the pulley 43 and back to the first pulley 42, forming a continuous belt. The object of providing the two pulleys 42 and the auxiliary pulley 41 is to afford greater frictional surface for the rope 46. The rope just described drives the rear wheels. Mounted on the pulleys 42, 39 and 43, on the opposite side of the machine, is a similar rope 47 for driving the front axle.

The practical operation of my improved friction and rope drive transmission hereinbefore described is as follows: Assuming that the machine is ready for use the wheel 19 is moved away from the wheels 23 and 24. The sleeve 18 is moved to position where the wheel 31 will not quite engage the wheels 23 and 24 and the wheel 29 is out of engagement with the wheels 23 and 24 and in position so that when the wheel 20 is moved toward the wheels 23 and 24 the fiber band 30 will be opposite the slot 28. The engine is then started and the wheel 19 is moved toward the wheels 23 and 24. I preferably provide mechanism whereby when the sleeve 18 is moved away from the wheel 19 the wheel 19 is moved in the opposite direction from the wheels 23 and 24. By sliding the sleeve on the shaft 17, the fiber band 30 will engage the wheels 13 and 24 near their outer edges. As the wheel 29 is moved toward the centers of the wheels 23 and 24 the speed of the machine is increased until the fiber surface 29ª engages the beveled edge of the hub 23ª when the car is at high speed.

It will be observed that at low speed, and at high speed, when the strain on the mechanism is the greatest, the friction gears are so formed that the beveled edges engage, thereby enabling me to secure the widest surface for frictional engagement at the time when said engagement is most needed. By the use of the beveled surface, I am also enabled to do away with the grinding which always occurs when friction gears are in engagement at right angles to each other. When the machine travels around a curve, one-half of each of the pulleys 43 will slip slightly with reference to the other half, thus allowing differential movement between the wheels on each axle. Differential movement between the front and rear axles is obtained by sliding of the friction gears.

The advantages of my improved transmission gearing may be largely seen from the foregoing description. I have provided a new and simple form of differential which is far less expensive than the old differential gearing. On account of the arrangement of the pulleys 42, 41 and 39 I obtain a maximum of frictional surface for the ropes 46. By driving both the rear and front wheels a smaller frictional surface will drive the machine than would be the case if only the rear wheels were driven. By the arrangement and construction of my friction transmission I secure broad beveled surfaces for engagement when the machine is traveling at low or high speed, thereby increasing the power transmitted over what would be possible with friction disks engaging each other at right angles. In addition to the increased power thus secured I am able to do away with the grinding which would otherwise occur.

I will now describe the manner in which my front wheels are mounted on the axles to permit lateral turning of the front wheels for steering purposes. On the outer end of each axle 13 is a ball 50, shown in Fig. 5. The sleeve 14 extends substantially to the ball 50. In opposite sides of the surfaces of the balls 50 are slots 51 which are wider at one end than at the other. Received within each slot 51 and extending substantially from one end to the other thereof, is a curved band or belt 52. Secured to each belt 52 is a pin 53 extending into the ball 50 and pivotally mounted therein. Secured to the opposite end of each band or belt 52 is an outwardly extending band 54. Surrounding the ball 50 is a bearing 54ª made in two parts, in which the bands 54 are pivotally mounted.

By the construction just described, the bearing 54ª is permitted universal movement with relation to the ball 50. Such movement is limited by the construction of the parts hereinafter described.

The outer surface of the bearing 54ª is angular. The hub 55 of each front wheel is hollow and the interior thereof is so shaped as to fit the bearing 54ª. On the outer side of the hub 55 is a cylindrical extension 56 forming a grease cup on which is a cap 57. Extending through the hub 55 and the bearing 54ª are grease openings 58 and 59. The opening 58 communicates with the grease cup 56. On its surface, adjacent to the middle of the machine, the bearing 54ª is provided with an annular slot. The hub 55 around said slot is screw threaded to receive a screw threaded annulus 60. The hub 55 is provided on its inner side with an outwardly extending annular flange 61 at the outer edge of which is an annular flange 62 extending toward the center of the machine. The spokes 63 of the front wheels rest against the hub 55 and the flange 61 and flat ring 64 are placed against the outer side of the inner ends of said spokes. The flange 61, the hub 63 and the ring 64 are secured together by means of rivets 65. Formed on the inside of the flange 62 is part of a ball race. Rotatably mounted on the sleeve 14, adjacent to each wheel, is a sleeve 66, having an annular outwardly extending flange 67 at its outer end, the periphery of which forms part of a ball race. The inner surface of the flange 62 adjacent to the ball race is screw threaded to receive a screw threaded ring 68 which also forms part of a ball race. In the race are ball bearings 69. Secured to the ring 68 are similar circular belts 70, having central openings which register with each other, as shown in Fig. 8. The flange 67 is formed with a horizontal elongated slot. The sleeve 66 is of the same width from top to bottom but is considerably wider at its inner than at its outer end, as clearly shown in Fig. 8. Formed on the outer end of the sleeve 14 is a portion having flat upper and lower surfaces and extending forwardly and rearwardly from the main body of said sleeve, which forms a bearing with relation to the sleeve 66.

On account of the construction of the ball 50, the pins 53 and 54, the bands 52, the bearing 54, the hub 55, the sleeve 66 and the sleeve 14 together with the flange 67, the wheel is permitted to rotate on the vertical axis only. At the same time a great advantage is secured in that the wheel is turned at its central and not on the short stub shaft as is ordinarily the case. In addition to this, the weight of the vehicle is carried on the ball 50. This is an advantage over carrying the weight on the stub shaft or on pins similar to the pins 53 and 54 as is sometimes done. The parts of the bearing 54ª are secured to the hub 55 by means of keys 71. Another advantage of the method of mounting the front wheels is found in the means for supplying oil or grease to the parts subject to friction.

In the following claims, by the use of the term "belt" I mean to include rope or other suitable devices.

It will be understood that a great many changes may be made in the details of the construction of my improved motor without departing from its essential features as defined in the following claims.

I claim as my invention:

1. In a device of the class described, a frame, an engine mounted thereon, an engine shaft operatively connected with the engine, a friction wheel slidably mounted on said shaft provided with a rim having a beveled edge and having a slot in its inner surface, a countershaft, a friction wheel thereon, having a beveled edge, a sleeve slidably mounted on said engine shaft, a friction wheel on said sleeve, having a beveled edge and provided with a friction band at its periphery, said wheel on said countershaft having a hub formed with a beveled edge designed to engage the beveled edge of the wheel on said sleeve in one position of the sliding movement thereof.

2. In a device of the class described, a frame, an engine mounted thereon, an engine shaft operatively connected with the engine, a friction wheel slidably mounted on said shaft, provided with a rim having a beveled edge and having a slot in its inner surface, a countershaft, a friction wheel thereon, having a beveled edge, a sleeve slidably mounted on said engine shaft, a friction wheel on said sleeve, having a beveled edge and provided with a friction band at its periphery, said wheel on said countershaft having a hub formed with a beveled edge, designed to engage the beveled edge of the wheel on said sleeve in one position of the sliding movement thereof, said parts being so constructed that when said first friction wheel engages the wheel on said countershaft, the third friction wheel may stand in position with said band opposite said slot, said third friction wheel being then inoperative.

3. In a device of the class described, a frame, an engine mounted thereon, an engine shaft operatively connected with the engine, a friction wheel slidably mounted on said shaft, provided with a rim having a beveled edge and having a slot in its inner surface, a countershaft, a friction wheel thereon, having a beveled edge, a sleeve slidably mounted on said engine shaft, a friction wheel on said sleeve, having a beveled edge and provided with a friction band at its periphery, said wheel on said countershaft having a hub formed with a beveled edge, designed to engage the beveled edge of the wheel on said sleeve in one position of the sliding movement thereof, said parts being so constructed that when said first friction wheel engages the wheel on said countershaft, the third friction wheel may stand in position with said band opposite said slot, said third friction wheel being then inoperative, and a second friction wheel on said sleeve having a beveled outer edge.

4. In a device of the class described, a frame, an engine mounted thereon, an engine shaft, a countershaft, a friction wheel thereon having a beveled outer edge and provided with a hub having a beveled surface, a friction wheel slidably mounted on said engine shaft, having a beveled outer edge, a third friction wheel, slidably mounted on said engine shaft and provided with a beveled edge designed to engage said hub in one position of the movement of said last described friction wheel and a friction band on the periphery of said third friction wheel designed to engage the face of said friction wheel on said counter shaft, said second and third friction wheels being so constructed that they may stand adjacent to each other with the second in engagement with the first wheel, and with the third wheel inoperative.

5. In a device of the class described, a frame, an engine mounted thereon, an engine shaft, a countershaft, a friction wheel thereon having a beveled outer edge and provided with a hub having a beveled surface, a friction wheel slidably mounted on said engine shaft, having a beveled outer edge, a second friction wheel slidably mounted on said engine shaft and provided with a beveled edge designed to engage said hub in one position of the movement of said last described friction wheel, a friction band on the periphery of said third friction wheel designed to engage the face of said friction wheel on said countershaft, the wheel on said countershaft being provided with an annular slot on its face adjacent to said hub.

6. In a device of the class described, a power shaft, a sleeve mounted thereon, a friction wheel on said sleeve having a beveled edge at its circumference, a friction wheel on the other end of said sleeve, a counter shaft arranged at right angles to the power shaft, a friction wheel mounted thereon, having a beveled edge at its circumference, said sleeve being capable of sliding movement on the power shaft and of sufficient length so that the two friction wheels on the sleeve cannot both be in gear with the wheel on the counter shaft at the same time.

7. In a device of the class described, a power shaft, a friction wheel slidably mounted thereon, having a beveled edge at its circumference, a second friction wheel slidably mounted on said shaft, a counter shaft arranged at right angles to said power shaft, a friction wheel thereon, having a beveled edge at its circumference, said first and second friction wheels being so constructed that they may stand adjacent to each other with the first wheel in engagement with said third wheel, and with the second wheel inoperative, said third wheel being provided with a gearing means at its hub, said second means being provided with gearing means adapted to coact with said last described gearing means.

Des Moines, Iowa, May 12, 1913.

EUGENE H. AVERY.

Witnesses:
O. J. SHELDON,
M. R. HIGBY.

Copies of this patent may be obtained for five cents each, by addressing the "Commissioner of Patents, Washington, D. C."